(12) United States Patent
Hori

(10) Patent No.: US 9,715,841 B2
(45) Date of Patent: Jul. 25, 2017

(54) INDICATION DEVICE

(71) Applicant: Yazaki Corporation, Minato-ku, Tokyo (JP)

(72) Inventor: Takahiro Hori, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 14/684,822

(22) Filed: Apr. 13, 2015

(65) Prior Publication Data

US 2015/0294540 A1 Oct. 15, 2015

(30) Foreign Application Priority Data

Apr. 14, 2014 (JP) .................. 2014-083204

(51) Int. Cl.
*G08B 5/22* (2006.01)
*G09F 13/04* (2006.01)
*B60K 35/00* (2006.01)
*G09F 13/08* (2006.01)

(52) U.S. Cl.
CPC .......... *G09F 13/0409* (2013.01); *B60K 35/00* (2013.01); *G09F 13/08* (2013.01); *G09F 2013/0427* (2013.01)

(58) Field of Classification Search
CPC ..................................... B60Q 3/04
USPC ................................. 340/815.45
See application file for complete search history.

(56) References Cited

U.S. PATENT DOCUMENTS

| | | | |
|---|---|---|---|
| 4,775,767 A * | 10/1988 | Sawada | H01H 9/182 200/310 |
| 5,615,501 A | 4/1997 | Rice | |
| 6,172,613 B1 * | 1/2001 | DeLine | B60K 35/00 248/549 |
| 6,420,800 B1 * | 7/2002 | LeVesque | B60R 1/088 307/10.1 |
| 6,466,260 B1 * | 10/2002 | Hatae | G08G 1/0175 348/149 |
| 7,468,651 B2 * | 12/2008 | DeLine | B60K 35/00 340/425.5 |
| 8,987,620 B2 * | 3/2015 | Gohng | G06F 3/016 200/61.54 |

(Continued)

FOREIGN PATENT DOCUMENTS

CN 1516089 A 7/2004
CN 101096192 A 1/2008

(Continued)

OTHER PUBLICATIONS

Office Action dated Jan. 22, 2017 issued by the State Intellectual Property Office of P.R. China in Chinese Patent Application No. 201510175933.9.

*Primary Examiner* — Santiago Garcia

(74) *Attorney, Agent, or Firm* — Sughrue Mion, PLLC

(57) ABSTRACT

An indication device includes an indication portion made of a light transmitting material and a cover portion made of a light blocking material. The indication portion has a sign including at least one of a character, a symbol and a figure. The cover portion covers a periphery of the sign of the indication portion. The sign is illuminated by light emitted by a light source and guided to the indication portion. The cover portion is configured such that a recess from a surface of the cover portion is provided in a region corresponding to the sign of the indication portion.

8 Claims, 8 Drawing Sheets

(56) References Cited

U.S. PATENT DOCUMENTS

| | | | | |
|---|---|---|---|---|
| 2007/0133219 A1* | 6/2007 | Chaloult | ............... | B60Q 3/007 |
| | | | | 362/490 |
| 2007/0199218 A1* | 8/2007 | Jiang | ................... | G02B 6/0033 |
| | | | | 40/546 |
| 2009/0322508 A1* | 12/2009 | Malik | ................... | B60Q 1/447 |
| | | | | 340/471 |
| 2011/0080481 A1* | 4/2011 | Bellingham | .............. | B60R 1/12 |
| | | | | 348/148 |
| 2012/0091623 A1* | 4/2012 | Wippler | ............. | B29C 45/0053 |
| | | | | 264/232 |
| 2014/0015976 A1* | 1/2014 | DeLine | ................ | B60Q 1/2665 |
| | | | | 348/148 |
| 2015/0022333 A1* | 1/2015 | Jim | ........................ | G08B 21/24 |
| | | | | 340/434 |

FOREIGN PATENT DOCUMENTS

| | | |
|---|---|---|
| CN | 201941667 U | 8/2011 |
| JP | 2008-192407 A | 8/2008 |

\* cited by examiner

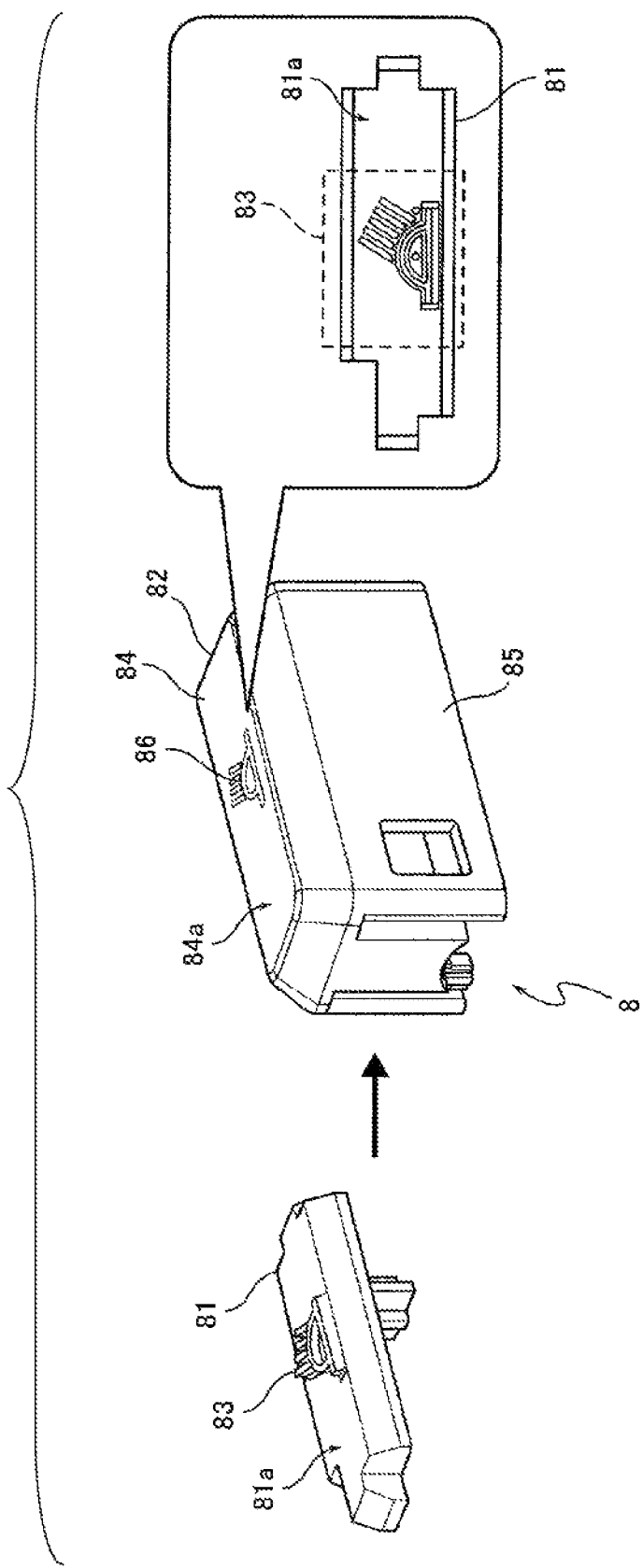

INDICATION DEVICE

CROSS-REFERENCE TO RELATED APPLICATIONS

The present application claims priority from Japanese Patent Application No. 2014-083204 filed on Apr. 14, 2014, the entire content of which is incorporated herein by reference.

FIELD OF INVENTION

The present invention relates to an indication device having an indication portion on which a sign to be illuminated is formed, the sign being a character, a symbol, a figure or the like.

RELATED ART

In related art indication devices for switch structures used in various electrical components mounted on vehicles such as automobiles, a sign such as a character or the like, indicating an operation, a function or the like, is provided on an indication portion of a switch knob, and the sign is illuminated so that a suitable operation can be performed during nighttime (see, e.g. JP2008-192407A).

For example, an indication device may be configured to illuminate a switch lamb having an indication portion made of a light transmitting, material and on which a sign such as a character indicating, an operation, a function or the like is provided to protrude from a surface of the indication portion and a cover portion made of a light blocking material and covering a surface of the indication portion other than the sign (a periphery of the sign). In this example, when the back side of the indication portion is irradiated with light emitted by a light source such as an LED device, the light is transmitted through the sign of the indication portion while the light is blocked by the cover portion in other region of the indication portion. Thus, only the sign is illuminated. In this manner, an operator can visually recognize the sign of the indication portion during nighttime or the like so that the operator can perform a suitable operation.

In such a switch structure, the indication portion and the cover portion may be integrally formed by, for example, two-color molding (double mold). For example, the indication portion may be made of a transparent resin or a semi-transparent resin and the cover portion may be made of a dark color resin such as a black resin. In such a case, the sign of the indication portion can be visually recognized clearly when the indication portion is irradiated with light from the light source. However, when the light source is turned off as in the daytime, the sign of the indication portion may not be visually recognized.

In addition, when the cover portion (second color) is formed after formation of the indication portion (first color), the resin flow collides against the sign protruding from the surface of the indication portion. Therefore, stress caused by the collision may be concentrated and loaded on a base part of the sign (a part adjoining the surface) and may damage the indication portion. In addition, fluidity of the resin may be lowered. Further, illumination of the sign may not be sufficiently bright due to light emitted by the light source not reaching the sign of the indication portion in an efficient manner.

SUMMARY

Illustrative aspects of the present invention provide an indication device with an indication portion that can be visually recognized clearly not only when a sign such as a character, a symbol, a figure or the like is illuminated but also when the sign is not illuminated, while improving productivity of the indication device.

According to an illustrative aspect of the present invention, an indication device includes an indication portion made of a light transmitting material and a cover portion made of a light blocking material. The indication portion has a sign including at least one of a character, a symbol and a figure. The cover portion covers a periphery of the sign of the indication portion. The sign is illuminated by light emitted by a light source and guided to the indication portion. The cover portion is configured such that a recess from a surface of the cover portion is provided in a region corresponding to the sign of the indication portion.

According to this configuration, when the cover portion is exposed to external light, a difference in reflection of the external light is generated between the recessed region and other region. Accordingly, the recess part becomes darker than the other part so that the sign of the indication portion corresponding to the recess part can be visually recognized clearly even when the sign of the indication portion is not illuminated.

The cover portion may be configured such that the recess does not have a bottom so as to expose the sign of the indication portion to the outside. With this configuration, light emitted by the light source and guided to the indication portion can be transmitted through the sign of the indication portion so that the transmitted light can reach the outside directly through the recess (opening) of the cover portion. Light transmitted through a portion of the indication portion other than the sign is blocked by the cover portion so that it is prevented from reaching the outside. Accordingly, only the sign of the indication portion is illuminated to make the sign of the indication portion visually recognized clearly.

The indication portion and the cover portion may be integrally formed by two-color molding. For example, the indication portion may be formed as the first color, the cover portion may be formed as the second color, and the indication portion may have an inclined surface raised toward the peripheral edge of the recess. With this configuration, when forming the cover portion, a resin can flow smoothly along the inclined surface and the recess can be formed in the cover portion at the same time. Accordingly, the resin flow can be suppressed from colliding against the sign of the indication portion so that the sign of the indication portion and its vicinity can be prevented from being damaged by stress concentration caused by the collision. In addition, fluidity of the resin during formation of the cover portion is improved so that the cover portion can be formed with good accuracy. Further, light guided to the indication portion can be concentrated along the inclined surface, so that brightness of light illuminating the sign of the indication portion can be enhanced and the visibility of the sign of the indication portion can be improved.

BRIEF DESCRIPTION OF THE DRAWINGS

FIG. 4 is a perspective view illustrating an overall configuration of a switch button;

DETAILED DESCRIPTION

Figure 1A:
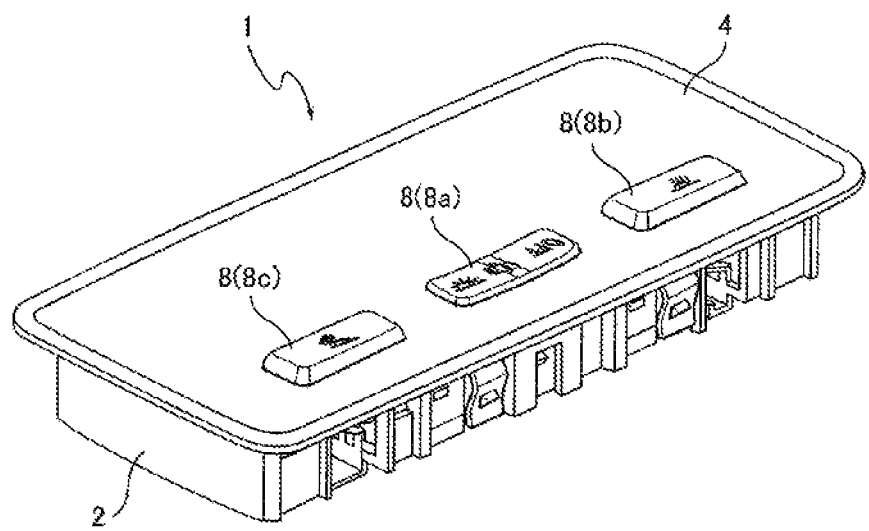
FIG. 1A is a operation side perspective view of an overall configuration of a map lamp having switch buttons, each being an indication device according to an embodiment of the invention.
Figure 1B:
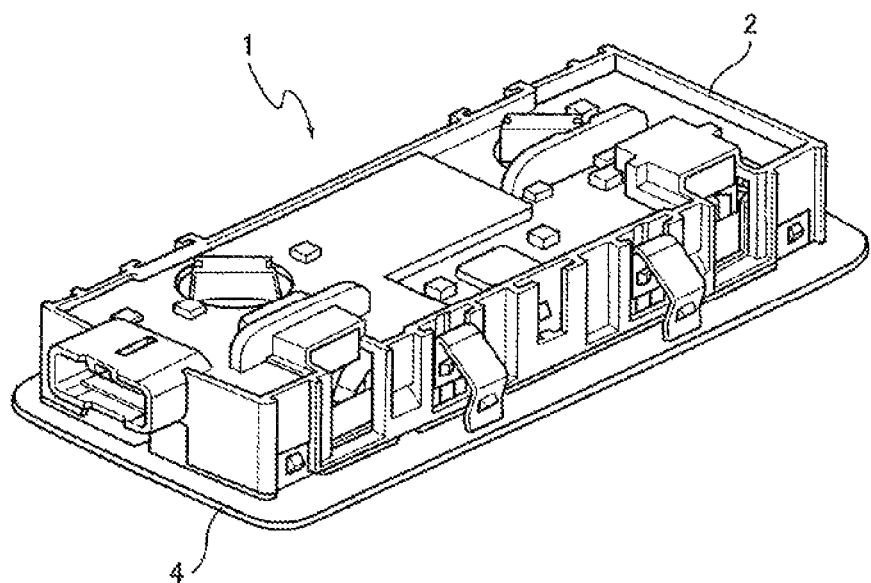
FIG. 1B is an attachment side perspective view of an overall configuration of the map lamp.
Figure 2:
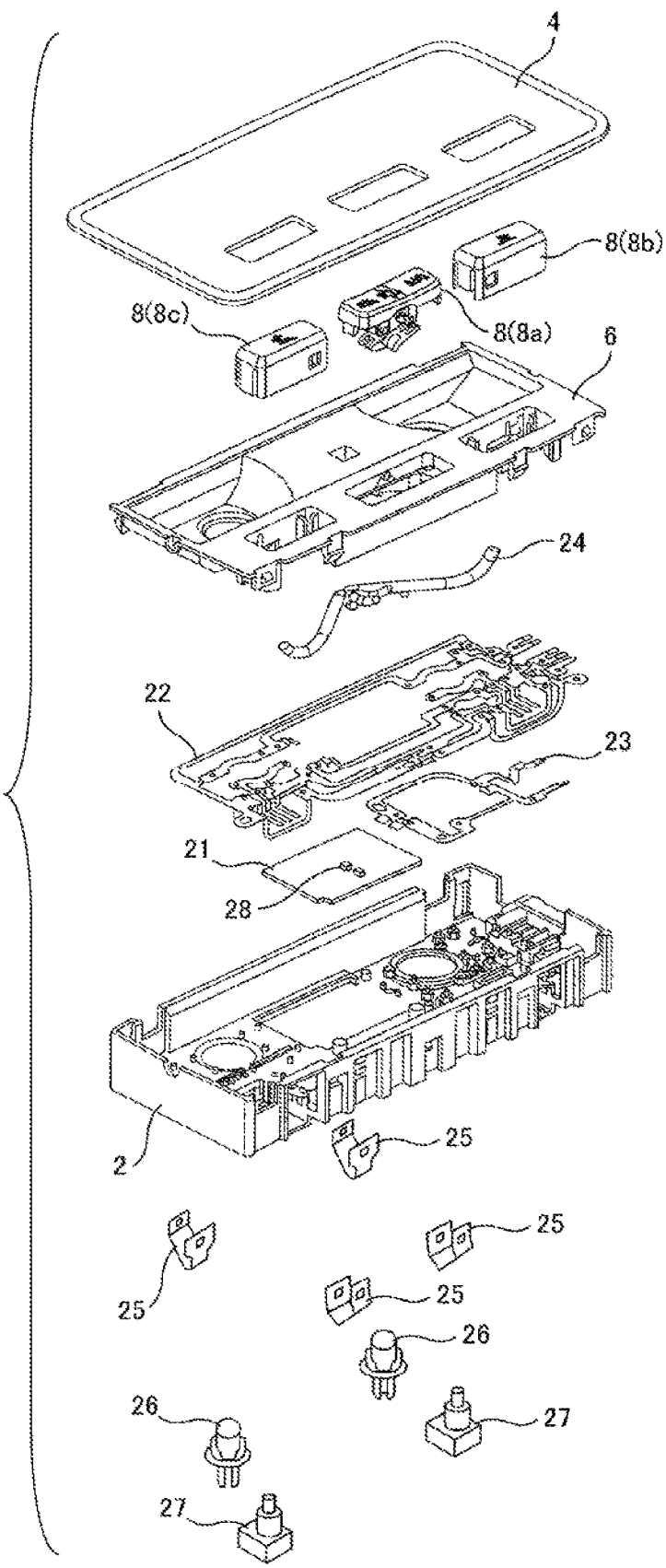
FIG. 2 is an exploded perspective view of the map lamp shown in FIGS. 1A and 1B.

An indication device according to the invention will be described below with reference to the accompanying drawings. FIGS. 1A to 2 illustrate a configuration of a map lamp 1 (a lighting device attached to an interior of a cabin of a car) as an example of the indication device according to an embodiment of the invention. FIGS. 1A and 1B are perspective views of the overall configuration of the map lamp 1. FIG. 1A is a view shown from an operation side. FIG. 1B is a view shown from an attachment side. FIG. 2 is an exploded perspective of the map lamp 1 shown in FIGS. 1A and 1B. In the map lamp 1 shown in FIG. 1A to FIG. 2, each switch button 8 is an example of the indication device. Before describing a detailed configuration of the switch button 8, the overall configuration of the map lamp 1 will be described.

As shown in FIGS. 1A to 2, the map lamp 1 is has a housing 2 and a lens 4. The housing 2 is a resin casing configured to accommodate various components to be assembled. The lens 4 is an outer lid covering the inside of the housing 2. In this embodiment, a circuit board 21, a main bus bar 22, a sub bus bar 23, a light tube 24, metal clips 25, bulbs 26, and push switches 27 are assembled and accommodated in the housing 2. The main bus bar 22 and the sub bus bar 23 are connected to the circuit board 21, and an LED device 28 as a light source for illuminating the switch buttons 8 is mounted on the circuit board 21. The light tube 24 is made of a light transmitting material such as a transparent resin. The light tube 24 splits and guides light emitted by the LED device 28 to back sides of the switch buttons 8 respectively. Each of the metal clips 25 is a member for attaching the map lamp 1 to the ceiling of the cabin. The metal clips 25 are attached to four places. Each of the bulbs 26 is an illumination device such as an LED bulb. The bulbs 26 are attached for a driver's seat and a passenger's seat so as to illuminate the seats respectively and separately.

An inner cover 6 is attached to the housing 2 in which these components have been assembled. The inner cover 6 is an inner lid member which is made of a resin. Due to the inner cover 6, the inside of the housing 2 in which the circuit board 21, the main bus bar 22 and the sub has bar 23 are received can be covered to seal these electronic components from the outside. The switch buttons 8 are attached to the inner cover 6. The switch buttons 8 are operation members for turning on/off the bulbs 26. A switch button 8a for turning on the two bulbs 26 together and for turning off the bulbs 26 together is attached as the center one of the switch buttons 8. A switch button 8b and a switch button 8c each for turning on only one (driver's seat side or passenger's seat side) of the bulbs 26 are attached as the others of the switch buttons 8 respectively. The specific configuration of each of these switch buttons 8 will be described later.

The lens 4 is attached to the inner cover 6 to which the switch buttons 8 have been attached. The lens 4 is a substantially flat plate-like member attached to the outer side of the inner cover 6. The lens 4 serves as an outer lid covering the inside of the housing 2 where the bulbs 26 are received. The lens 4 is made of a light transmitting material such as a transparent resin to serve for concentrating light emitted from the bulbs 26 on the driver's seat side and the passenger's seat side.

Figure 3A:
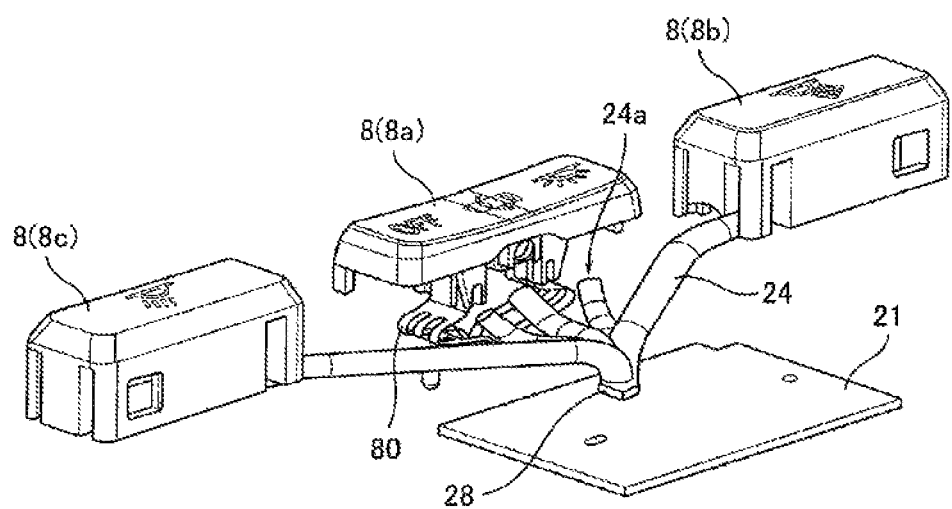
FIG. 3A is a perspective view illustrating how light is guided to the switch buttons.
Figure 3B:
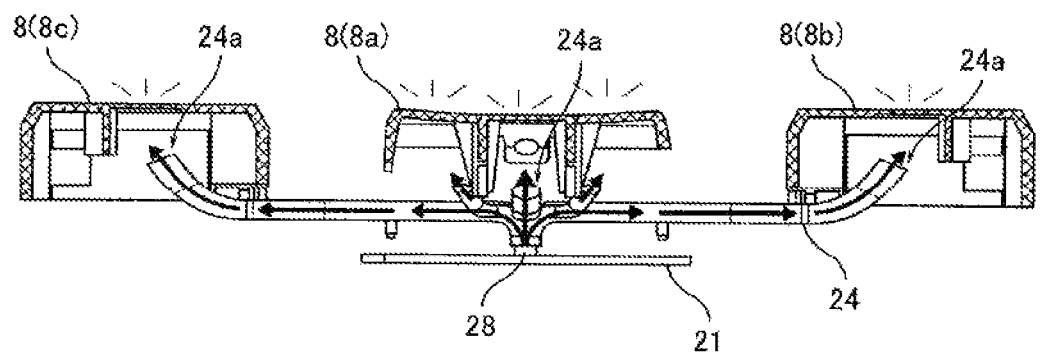
FIG. 3B is a vertical sectional view illustrating how the light is guided to the switch buttons.

In the map lamp 1 configured thus, light emitted by the LED device 28 on the circuit board 21 is guided to the backs of the switch buttons 8 through the light tube 24 as shown in FIGS. 3A and 3B. FIGS. 3A and 3B are views illustrating how light is guided to the switch buttons 8. FIG. 3A is a perspective view. FIG. 3B is a vertical sectional view. In this example, the light tribe 24 shaped like strings is attached to the LED device 28 so that a light-emitting portion of the LED device 28 is capped by the light tube 24. The light tube 24 is branched and extended from the portion capping the LED device 28 and is arranged so that distal ends 24a of the light tube 24 reach the three switch buttons 8a to 8c. In this manner, the switch buttons 8 attached in positions where light emitted by the LED device 28 cannot arrive directly can be irradiated with the light. In addition, a contact 80 having a spring structure and made of metal such as a copper alloy is attached to each switch button 8. When the switch button 8 is operated, the contact 80 moves in its operating direction so that the bulbs 26 are turned on and off.

Next, a configuration of the switch button 8, an indication device according to the embodiment of the invention, will be described below in detail.

Figure 5A:
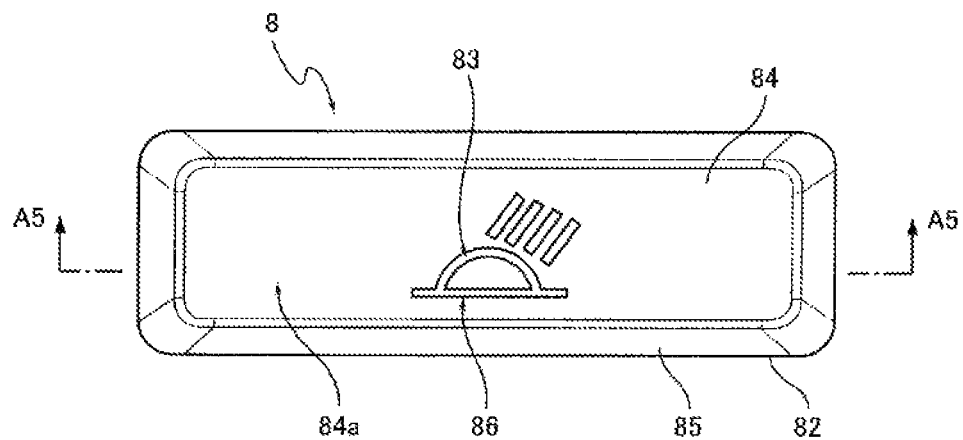
FIG. 5A is a plan view, seen from a surface side (an operation side), of a switch button having an indication portion and a cover portion that are formed by two-color molding.
Figure 5B:
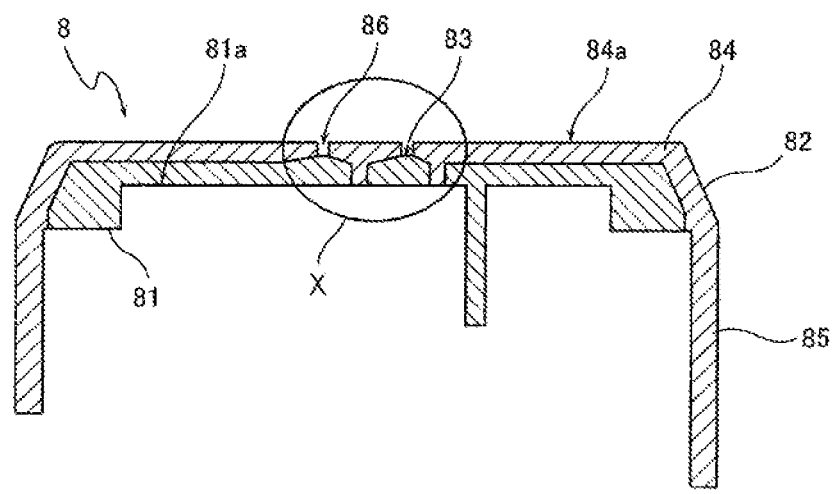
FIG. 5B is a vertical sectional view taken along the line A5-A5 of FIG. 5A.
Figure 5C:
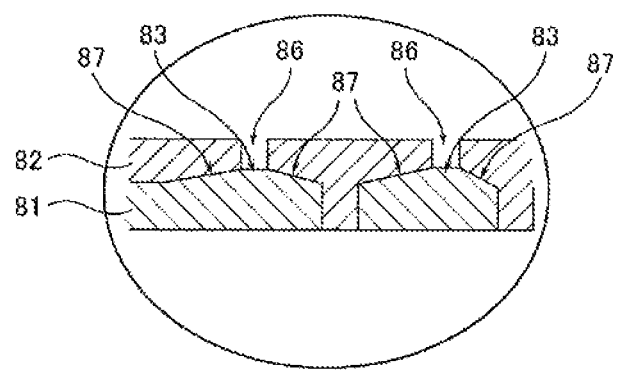
FIG. 5C is an enlarged view of a portion X in FIG. 5B.

An overall configuration of the switch button 8 is shown in FIGS. 4 to 5C. As shown in FIGS. 4 to 5C, the switch button 8 has an indication portion 81 and a cover portion 82. The indication portion 81 is made of a light transmitting material such as a transparent resin or a semi-transparent resin. The cover portion 82 is made of a light blocking material such as a dark color resin (for example, a black resin), and covers the indication portion 81. The indication portion 81 and the cover portion 82 are integrally formed by two-color molding (double mold) so that the indication portion 81 can be formed as a first color and the cover portion 82 can be formed as a second color. FIG. 4 illustrates a configuration of the switch button 8b on the driver's seat side as an example. Other switch buttons 8a, 8c also have similar configuration. FIGS. 5A to 5C illustrate a configuration of the switch button 8 in which the indication portion 81 and the cover portion 82 are formed by two-color molding as described above. FIG. 5A is a plan view of a surface side (an operation side). FIG. 5B is a vertical sectional view taken along the line A5-A5 of FIG. 5A. FIG. 5C is an enlarged view of a portion X in FIG. 5B.

The indication portion 81 is substantially shaped like a rectangular flat plate. A sign 83 including at least one of a character, a symbol and a figure indicating operation contents or a function of the switch button 8 is provided in a surface 81a. In this case, the sign 83 including a figure indicating that the bulb 26 on the driver's seat side is turned on to illuminate the driver's seat side is provided in the indication portion 81 to protrude from the surface 81a.

The cover portion 82 is shaped like a box having a base 84 and a wall 85. The base 84 is formed into a rectangular shape slightly larger than the surface 81a of the indication portion 81, and covers a periphery of the sign 83. The wall 85 extends from a perimeter of the base 84. The contact 80 is attached in an internal space surrounded by the base 84 and the wall 85. The light tube 24 is wired so that each of the distal end portions 24a of the light tube 24 can be directed toward the base 84.

The base 84 of the cover portion 82 is formed such that a region corresponding to the sign 83 of the indication portion 81 is recessed from a surface 84a. In other words, the base 84 is formed on top of a portion other than the sign 83 so that the region corresponding to the sign 83 is relatively recessed. Accordingly, a step 86 (a recess) is provided in a region corresponding to the sign 83, between the surface 84a of the base 84 and the surface 81a of the indication portion 81.

Figure 6A:
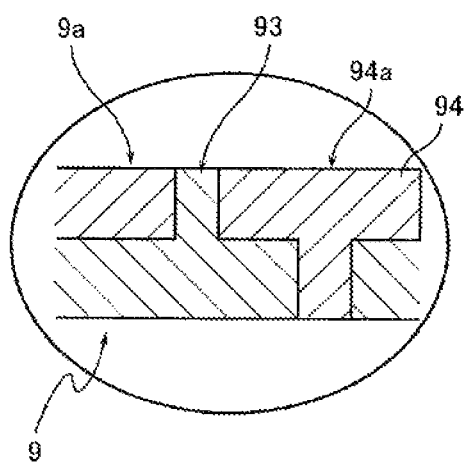
FIG. 6A illustrates a comparative example in which an operation surface of a switch button is flush.

Here, according to a comparative example shown in FIG. 6A in which a surface 94a of a base 94 is not recessed such that a sign 93 and the surface 94a are flush with each other to form an operation surface 9a of a switch button 9, the surface 94a and the sign 93 framing the operation surface 9a are exposed to external light in a uniform manner. Accordingly, when the base 94 is made of a light blocking resin such as a black resin, visibility of the sign 93 may deteriorate when the switch button 9 is not illuminated.

Figure 6B:
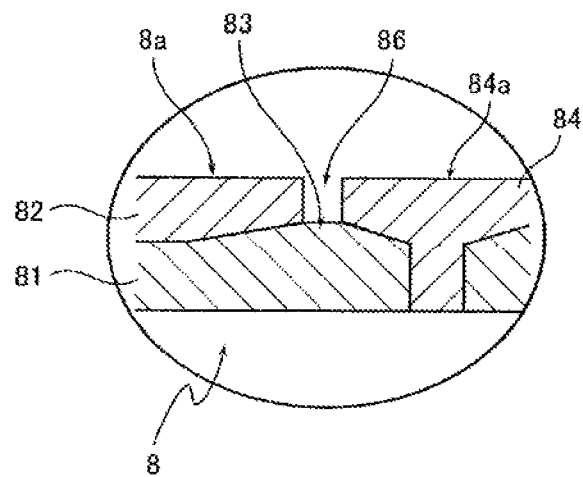
FIG. 6B illustrates an embodiment of the invention in which a recess is formed in the operation surface.

On the other hand, according to an embodiment of the present invention as shown in FIG. 6B, the operation surface 8a of the switch button 8 is provided with unevenness due to the surface 84a of the base 84 and the recess 86. Accordingly, when the operation surface 8a is exposed to external light, the entire surface 84a is irradiated with the external light but less light reaches the recess 86 as compared with the surface 84a. Therefore, due to a difference generated in reflection of the external light, the recess 86 becomes darker than the surface 84a so that the sign 83 corresponding to the recess 86 can be visually recognized clearly. Accordingly, even when the switch button 8 is not illuminated as in the daytime, an operator can clearly recognize an operation or a function associated with the switch button 8 as indicated by the sign 83. Thus, it is possible to reliably guide the operator to perform a suitable operation.

In addition, the cover portion 82 is configured such that the recess 86 does not have a bottom so as to expose the region corresponding to the sign 83 of the indication portion 81 to the outside. Accordingly, when the LED device 28 is turned on, light emitted by the LED device 28 is guided by the light tube 24 and transmitted through the sign 83 of the indication portion 81 so that the light can reach the outside directly through the recess 86 (i.e. an opening). On the other hand, light transmitted through the indication portion 81 in a portion other than the sign 83 is blocked by the base 84 of the cover portion 82 so as not to reach the outside. That is, on the operation surface of the switch button 8, only the sign 83 facing the outside through the recess 86 is illuminated. Accordingly, the sign 83 can be visually recognized by an operator clearly.

In addition, as shown in FIG. 5C, the indication portion 81 has an inclined surface 87 raised toward the peripheral edge of the recess 86. In other words, the sign 83 is formed on the indication portion 81 such that a cross section of a periphery of the sign 83 has a tapered shape raised toward the recess 86. In this example, the inclined surface 87 is formed when framing the indication portion 81 as the first color in the two-color molding.

Figure 7A:
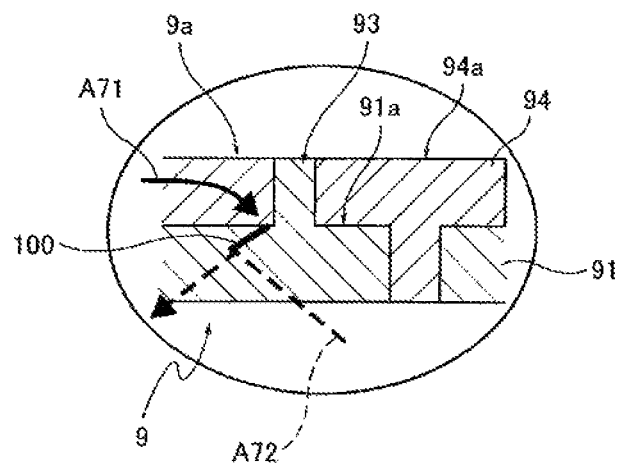
FIG. 7A illustrates the comparative example in which a crack is formed in an indication portion due to a stress load from a resin flow.
Figure 7B:
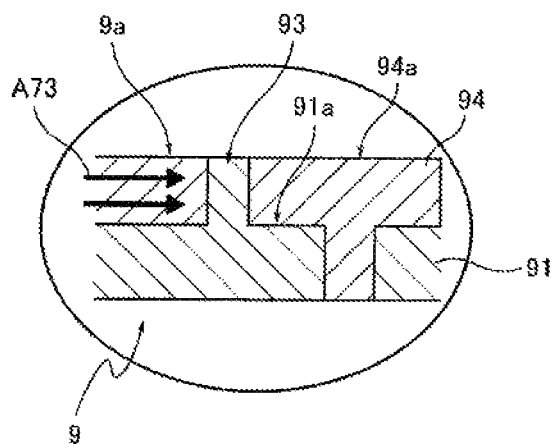
FIG. 7B illustrates the comparative example in which fluidity of the resin is lowered due to collision against a sign.

Here, in the comparative example shown in FIG. 7A, the surface 94a of the base 94 is not recessed such that the surface 94a and the sign 93 are flush with each other to form the operation surface 9a of the switching blob 9. The sign 93 is provided to protrude from a flat surface 91a of an indication portion 91 without an inclination on the surface 91a. That is, the indication portion 91 does not have an inclined surface 87 as in the indication portion 81. In this case, when the base 94 is formed as the second color of the two-color molding, a resin flow collide against the first-color sign 93 (see the arrow A71) so that the stress caused by the collision is concentrated and loaded on a base part of the sign 93 (a part adjoining the surface 91a) and may produce a crack 100. When the crack 100 is formed, the visibility of the sign 93 may deteriorate due to uneven light emission caused by light reflected diffusedly on the crack (see the arrow A72) during illumination of the sign 93. In addition, since the resin flow collides against the sign 93 as shown in FIG. 7B (see the arrow A73), the fluidity of the resin may be deteriorated so that the resin may not flow smoothly in the vicinity of the sign 93 during formation of the base 94, in which the base 94 may not be formed with good accuracy.

Figure 7C:
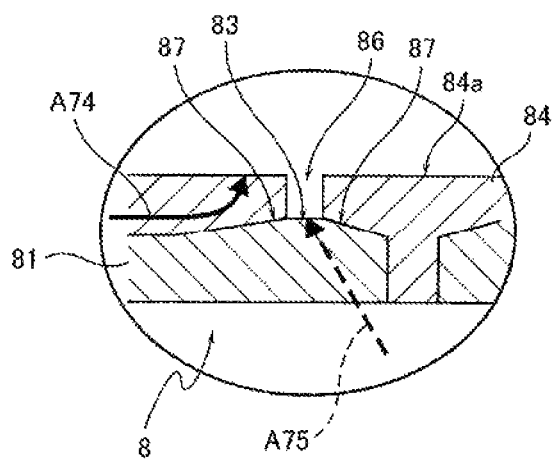
FIG. 7C illustrates an embodiment of the invention in which a stress load from a resin flow is reduced and fluidity of the resin is improved.

In contrast, according to an embodiment of the present invention, as shown in FIG. 7C, the inclined surface 87 is formed on the indication portion 81 as the first color of the two-color molding. Accordingly, when the base 84 is formed as the second color of the two-color molding, the resin flows smoothly along the inclined surface 87 and the recess 86 is formed in the base 84 at the same time. Accordingly, the resin flow can be suppressed from colliding against the sign 83 so that stress concentration caused by the collision can be avoided (see the arrow A74). In this manner, the sign 83 and its vicinity can be prevented from being damaged so that the sign 83 can be illuminated uniformly without any light emission unevenness (see the arrow A75). Accordingly, the visibility of the sign 83 can be improved. In addition, the resin can flow smoothly along the inclined surface 87 while the resin flow is suppressed from colliding against the sign 83. Accordingly, the fluidity of the resin during formation of the base 84 can be enhanced so that the formation accuracy of the base 84 is improved.

Figure 8A:
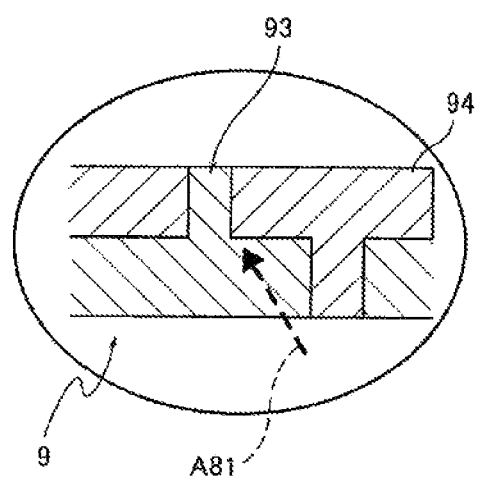
FIG. 8A illustrates the comparative example in which sufficient brightness of light illuminating the sign cannot be obtained.

In addition, as shown in FIG. 8A, in the aforementioned comparative example, when the sign 93 is illuminated, light other than light travelling straightly toward the sign 93 hardly reaches the sign 93 and the light not reaching the sign 93 is easily blocked by the base 94 (see the arrow A81). Therefore, sufficient brightness of light illuminating the sign 93 may not be obtained.

Figure 8B:
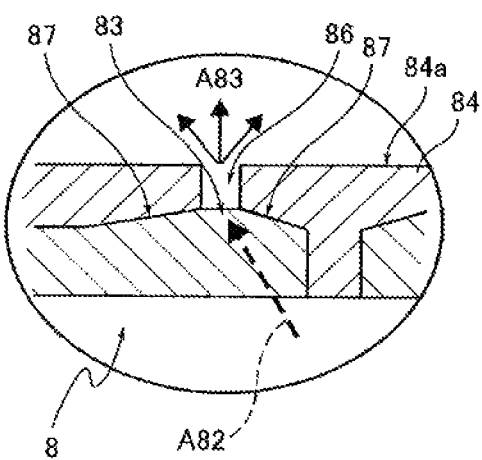
FIG. 8B illustrates an embodiment of the invention in which brightness of light illuminating a sign is enhanced and visibility of the sign is improved.

In contrast, according to the embodiment as shown in FIG. 8B, when the sign 83 is illuminated, light guided to the switch button 8 can be concentrated along the inclined surface 87. Accordingly, light other than the light travelling straightly toward the sign 83 can be guided to the sign 83 (see the arrow A82). In addition, the distance (in an up-down direction in FIG. 8B) between the sign 83 and the surface 84a of the base 84 is shortened correspondingly to the shape of the sign 83 tapered toward the peripheral edge of the recess 86. Accordingly, brightness of light illuminating the sign 83 can be enhanced so that the visibility of the sign 83 can be improved (see the arrow A83).

Thus, according to the embodiment, the recess 86 is feinted in the base 84 of the cover portion 82. Accordingly, the visibility of the sign 83 can be enhanced when the sign 83 is not illuminated. In addition, since the inclined surface 87 is formed in the indication portion 81, the damage can be prevented and the formation accuracy can be enhanced. Accordingly, productivity of the switch button 8 can be improved, and the visibility of the sign 83 can be also enhanced when the sign 83 is illuminated.

While the present invention has been described with reference to certain exemplary embodiments thereof the scope of the present invention is not limited to the exemplary embodiments described above, and it will be understood by those skilled in the art that various changes and modifications may be made therein without departing from the scope of the present invention as defined by the appended claims.

For example, the case where the indication device is used as each switch button 8 of the map lamp 1 has been described in the aforementioned embodiment. However, the indication device may be also used, for example, as a switch blob, a lever, a dial etc. for operating various pieces of equipment, or as a guide plate, an indicator etc.

What is claimed is:

1. An indication device comprising:
    an indication portion which internally transmits light, the indication portion comprising a sign which made entirely of a light transmitting material such that the sign internally transmits light, the sign protruding integrally and continuously from a top surface of the indication portion, a top surface of the sign being provided in a shape of at least one of a character, a symbol and a figure; and
    a cover portion made of a light blocking material, the cover portion covering a periphery of the sign of the indication portion,
    wherein the sign is internally illuminated by light emitted by a light source and guided to the indication portion, and
    wherein the cover portion is configured such that a recess from a surface of the cover portion is provided in a region corresponding to the sign of the indication portion.

2. The indication device according to claim 1, wherein a bottom of the recess is opened so that the sign of the indication portion faces an outside.

3. The indication device according to claim 1, wherein the indication portion and the cover portion are integrally formed by two-color molding.

4. The indication device according to claim 3, wherein the indication portion has an inclined surface raised toward a peripheral edge of the recess.

5. An indication device comprising:
    an indication portion which internally transmits light, the indication portion comprising a sign which made entirely of a light transmitting material such that the sign internally transmits light, the sign protruding integrally and continuously from a top surface of the indication portion such that a top surface of the sign is raised relative to the top surface of the indication portion, the top surface of the sign being provided in a shape of at least one of a character, a symbol and a figure; and
    a cover portion made of a light blocking material, the cover portion covering a periphery of the sign of the indication portion,
    wherein the sign is internally illuminated by light emitted by a light source and guided to the indication portion, and
    wherein the indication portion has an inclined surface extending between the top surface of the indication portion and a peripheral edge of the top surface of the sign.

6. The indication device according to claim 5, wherein the cover portion is configured such that a recess from a top surface of the cover portion is provided in a region corresponding to the sign of the indication portion.

7. The indication device according to claim 6, wherein a bottom of the recess is opened so that the sign of the indication portion faces an outside.

8. The indication device according to claim 5, wherein the indication portion and the cover portion are integrally formed by two-color molding.

\* \* \* \* \*